United States Patent
Nellis et al.

(10) Patent No.: US 11,453,158 B2
(45) Date of Patent: Sep. 27, 2022

(54) 3D STRUCTURES AND METHODS THEREFOR

(71) Applicant: Wisconsin Alumni Research Foundation, Madison, WI (US)

(72) Inventors: Gregory Nellis, Madison, WI (US); Jake Boxleitner, Madison, WI (US); Thomas Mulholland, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 518 days.

(21) Appl. No.: 16/193,733

(22) Filed: Nov. 16, 2018

(65) Prior Publication Data

US 2020/0156309 A1 May 21, 2020

(51) Int. Cl.
*B29C 64/118* (2017.01)
*B33Y 10/00* (2015.01)
(Continued)

(52) U.S. Cl.
CPC .......... *B29C 64/118* (2017.08); *B23P 15/26* (2013.01); *B33Y 10/00* (2014.12); *B33Y 70/00* (2014.12);
(Continued)

(58) Field of Classification Search
CPC ..... B29C 64/106; B29C 64/118; B33Y 10/00; B33Y 70/00; B33Y 80/00; F28D 1/0535;
(Continued)

(56) References Cited

U.S. PATENT DOCUMENTS

| 7,810,552 B2 * | 10/2010 | Slaughter | F28F 7/02 165/148 |
| 10,184,728 B2 * | 1/2019 | Sabo | B22F 3/1055 |

(Continued)

FOREIGN PATENT DOCUMENTS

WO    2018054724 A1    3/2018

OTHER PUBLICATIONS

Boxleitner et al., "Additive Design and Manufacturing of a Composite Polymer Heat Exchanger," 17th Int'l Refr. And AC Conference at Purdue, Jul. 9-12, 2018, 10 pgs.
(Continued)

*Primary Examiner* — Len Tran
*Assistant Examiner* — Gustavo A Hincapie Serna
(74) *Attorney, Agent, or Firm* — Crawford Maunu PLLC

(57) ABSTRACT

Aspects of the disclosure are directed to methods and/or apparatuses involving one or more of a conductive polymer, deposition of a conductive polymer and 3D (three-dimensional) printing of a continuous bead of material. As may be implemented in accordance with one or more embodiments characterized herein, a 3D structure is formed as follows. A stacked layer is formed by depositing a continuous bead of material along an uninterrupted path that defines a first layer of the 3D structure. A sidewall of the 3D structure is formed with opposing surfaces respectively defined by successive stacked layers of the 3D structure by, for each stacked layer (including the first layer), depositing the continuous bead of material along the path and with a surface thereof in contact with a surface of the continuous bead of material of an adjacent one of the stacked layers.

19 Claims, 11 Drawing Sheets

(51) Int. Cl.
  *B33Y 70/00*     (2020.01)
  *B33Y 80/00*     (2015.01)
  *F28D 7/00*     (2006.01)
  *B23P 15/26*     (2006.01)
  *B29L 31/18*     (2006.01)
  *B29K 505/02*     (2006.01)
  *B29K 69/00*     (2006.01)
  *B29K 505/10*     (2006.01)

(52) U.S. Cl.
  CPC ............ *B33Y 80/00* (2014.12); *F28D 7/0041* (2013.01); *B29K 2069/00* (2013.01); *B29K 2505/02* (2013.01); *B29K 2505/10* (2013.01); *B29K 2995/0013* (2013.01); *B29L 2031/18* (2013.01)

(58) Field of Classification Search
  CPC .... F28D 7/0041; B23P 15/26; B29L 2031/18; B29K 2069/00; B29K 2505/02; B29K 2505/10; B29K 2995/0013; B22F 3/1055; B22F 5/10; F28F 1/124; F28F 2215/06; F28F 2255/06; F28F 3/022; F28F 3/044
  See application file for complete search history.

(56) References Cited

U.S. PATENT DOCUMENTS

| | | | | |
|---|---|---|---|---|
| 10,654,103 | B2* | 5/2020 | Jonnalagadda | H01L 23/36 |
| 10,821,633 | B1* | 11/2020 | Quinonez | B29C 41/12 |
| 2011/0262654 | A1 | 10/2011 | Yates et al. | |
| 2015/0137412 | A1* | 5/2015 | Schalansky | B33Y 10/00 264/129 |
| 2017/0299239 | A1* | 10/2017 | Steven | F25B 39/00 |
| 2017/0356696 | A1* | 12/2017 | Zaffetti | B23K 26/342 |
| 2018/0045472 | A1* | 2/2018 | MacLellan | F28D 9/0031 |
| 2018/0120037 | A1* | 5/2018 | Campbell | F28F 21/067 |
| 2018/0208762 | A1* | 7/2018 | Pomestchenko | B29C 70/882 |
| 2018/0245853 | A1* | 8/2018 | Sennoun | F28F 1/40 |
| 2018/0283795 | A1* | 10/2018 | Cerny | F28D 1/0472 |
| 2018/0292146 | A1* | 10/2018 | Furrer | F28F 3/048 |
| 2018/0345425 | A1* | 12/2018 | Caimano | B22F 10/20 |
| 2019/0063848 | A1* | 2/2019 | Miller | F28F 13/06 |
| 2019/0120562 | A1* | 4/2019 | Fuller | F28F 9/0268 |
| 2019/0210278 | A1* | 7/2019 | Hikmet | F21V 7/24 |
| 2020/0003497 | A1* | 1/2020 | Aston | F28F 7/02 |
| 2020/0016823 | A1* | 1/2020 | Hymas | B29C 64/118 |
| 2020/0033062 | A1* | 1/2020 | Barney | F28F 1/26 |
| 2020/0141656 | A1* | 5/2020 | Lewandowski | F28F 3/04 |

OTHER PUBLICATIONS

Nikzad et al., "Thermo-mechanical properties of a highly filled polymeric composites for Fused Deposition Modeling," Materials and Design, 32(6):3448-3456 (2011).

Siberline, "Silberline Core Pigments for Plastics," Silberline brochure 12 pgs. (2008).

Stansbury et al., "3D printing with polymers: Challenges among expanding options and opportunities," Dental Materials 32:54-64 (2016).

TCPOLY, "Thermally Conductive Filament Materials Properties," TCPOLY Specification Sheet, 1 pg.

* cited by examiner

3D STRUCTURES AND METHODS THEREFOR

FEDERALLY SPONSORED RESEARCH OR DEVELOPMENT

This invention was made with government support under DE-AR0000573 awarded by the US Department of Energy. The government has certain rights in the invention.

OVERVIEW

Aspects of the present disclosure are directed to three-dimensional (3D) structures and their manufacture. Certain aspects are directed to a polymer-based material having metallic conductors, such as metallic flakes or spheres, added therein.

Various aspects are directed to addressing challenges to one or more of the design, manufacture and resulting structure/implementation of 3D structures. Certain aspects are directed to addressing challenges presented by materials used in such aspects, and the processing thereof.

One area in which 3D structures are beneficially used involves heat exchangers. Many metal-based materials used in such applications can be susceptible to corrosion, or suffer performance issues when modified to address corrosion. Further, various materials may be relatively expensive and/or present incompatibilities with certain fluids or other environmental conditions in which their implementation is desired.

The design and manufacture of 3D structures utilizing metal-based materials can be expensive. For certain applications, dies or other components need to be manufactured in order to make new 3D structural designs. Processes such as stamping and brazing can be expensive and challenging to implement. Lead-time for accommodating design and related components needed for the manufacture of new products can be undesirably long.

These and other matters have presented challenges to the manufacture and implementation of 3D structures, for a variety of applications.

SUMMARY

Various example embodiments are directed to forming 3D structures, articles of manufacture for forming such structures, related apparatuses and methods, which may address various challenges including those noted above.

As may be implemented in accordance with one or more embodiments, a method includes forming a first stacked layer by depositing a continuous bead of material along an uninterrupted path that defines a first layer of a three-dimensional (3D) structure. A sidewall of the 3D structure is formed having opposing surfaces respectively defined by the first stacked layer and successive stacked layers of the 3D structure by, for each successive stacked layer, depositing the continuous bead of material along the path and with a surface thereof in contact with a surface of the continuous bead of material of an adjacent one of the stacked layers. The continuous bead and resulting stacked layers may thus be formed without interruptions in the deposited material, mitigating issues including those characterized above.

Another embodiment is directed to an apparatus comprising a first stacked layer of a continuous bead of material extending along a path that defines a first layer of a three-dimensional (3D) structure, and a sidewall of the 3D structure having opposing surfaces respectively defined by the first stacked layer and successive stacked layers of the 3D structure. Each stacked layer includes a portion of the continuous bead of material that extends along the path and with a surface thereof in contact with a surface of the continuous bead of material of an adjacent one of the stacked layers.

As may be implemented in accordance with one or more embodiments, a method of 3D-printing is implemented as follows. A conductive polymer-based material is formed by dispersing a plurality of metal-based flakes in a polymer, and a 3D structure is formed by extruding the conductive polymer-based material from a nozzle along a continuous path. This approach may, for example, facilitate formation of a 3D structure with an uninterrupted bead of material, addressing issues including those characterized above. In some implementations, layers of a continuous bead of the extruded polymer-based material are stacked along the continuous path to form sidewalls of the 3D structure. In particular implementations, the conductive polymer-based material is extruded from a nozzle along a continuous path by forming a sidewall of the 3D structure having conductivity along a length thereof that is within about 10% or about 20% of conductivity in a direction across a thickness of the sidewall.

One or more aspects of the disclosure are directed to an article of manufacture and/or its use. The article of manufacture comprises a polymer-based material and a plurality of metal-based flakes dispersed within the polymer-based material and configured therewith to provide, in response to being extruded from a nozzle, an extrudate extending along a length in a first direction with conductivity along the length that is within about 10% of about 20% of conductivity across a width of the extrudate.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIGS. 3A and 3B show a heat exchanger apparatus, as may be formed and/or implemented in accordance with various embodiments, in which:

FIG. 3A shows a perspective view with cross-flow characteristics of the apparatus, and FIG. 3B shows a perspective view of the apparatus with a header attached thereto;

Figure 1:
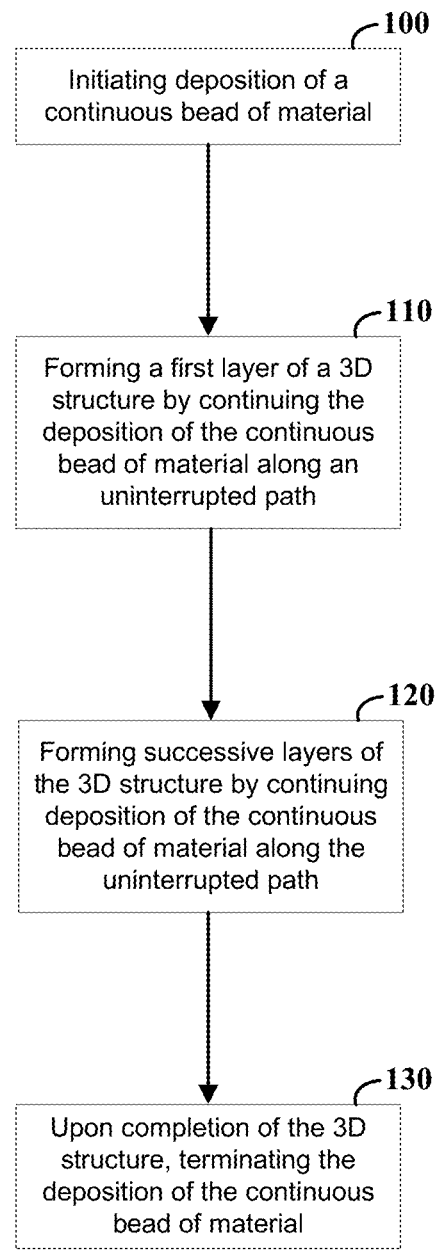
FIG. 1 shows a data flow diagram, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving 3D structures. Various aspects of the present disclosure have been shown to be beneficial when used in the context of forming such 3D structures with sidewalls defined using an uninterrupted deposition process, such as via 3D printing. Such an approach may involve initiating material deposition and continuing the deposition to form successive layers of the 3D structure without interrupting the deposition. Using a continuous bead of material in this manner can facilitate resulting structure that is mechanically desirable, and may address issues such as those noted above. Each successive layer of the continuous bead may be offset relative to adjacent layers to form desired structural features.

Accordingly, the design of 3D structures can be tailored to suit such a continuous deposition process so that the structure can be formed using an uninterrupted bead of material. Furthermore, such an approach facilitates economical manufacturing characteristics. It has been recognized/discovered that such an approach, as may involve one or more of path design, deposition method, and resulting structure can facilitate both mechanical and manufacturing characteristics that address challenges including those noted hereinabove. For instance, by ensuring that regions of an apparatus such as fins in a heat exchanger are watertight via use of continuous deposition, the quality of the resulting product can be enhanced. Further, such approaches can be utilized to form walls with low porosity and structure with faster print times.

In certain particular embodiments, 3D structures are formed such that areas important for watertight function are formed from a continuous bead, whereas other areas of the structures that may not require such watertight function may include locations at which such a bead is broken. Further, the bead may be broken within a thick section of a 3D structure such that surrounding material maintains watertight function, while thinner portions (e.g., walls such as in a heat exchanger) of the 3D structure are formed with a continuous bead. In various instances, the bead is not broken along the heat transfer surface (or any water-tight area). It has been recognized/discovered that such an approach can facilitate the formation of thin walls having high heat transfer capabilities, while ensuring any break in a bead of material (e.g., between sets of layers of such material) is made in regions of the structure that can accommodate such a broken bead. Accordingly, parts may be designed in a manner that facilitates the use of a single bead for manufacturing thin-walled areas, with thicker or other less important regions being designed to accommodate a break in the bead.

Various aspects of the present disclosure are directed to additive design and manufacturing of tapered geometry, which may be utilized in a variety of 3D structures. For instance, such an approach can be implemented to provide a tapered airside geometry in a composite polymer heat exchanger. Such approaches can be carried out using fused material extrusion processes which may include filament fabrication (FFF). Fused Filament Fabrication (FFF) is a relatively low cost additive manufacturing process that may involve depositing a thermoplastic material layer by layer. Using the FFF process, material can be strategically deposited, creating complex geometries that are not physically or economically feasible by other processes. Part geometry and tool path can be configured relative to one another to facilitate formation of the part utilizing a continuous deposition process which results in stacked layers of an uninterrupted material. This approach facilitates use of relatively low-conductive polymers or filled polymer materials that can provide high performance thermally, hydraulically, and economically. For instance, a heat transfer geometry can be formed to facilitate continuous flow of material in every layer with minimal overhangs. This continuous flow/deposition may also facilitate the formation of a water tight channel that can be deposited economically. The continuous bead allows the heat exchangers to withstand meaningful operating pressures while keeping production costs low. Air-side geometries with a high heat transfer coefficient and low pressure drop can be achieved while limiting/minimizing conduction lengths.

Certain aspects of the disclosure are directed to a thermally conductive polymer composite material, with a variety of applications including the formation of 3D structures. Such structures may be formed via 3D printing involving material extrusion methods and various deposition methods. In some implementations, the polymer composite material includes a mixture of a neat polymer and metal flakes. It has been recognized/discovered that, utilizing metallic flakes of a tailored size and percentage composition within the neat polymer can yield a desirable material. Such a material may be spoolable, printable, thermally conductive, mechanically resistant, and can flow through a 3D printing nozzle without clogging at an acceptable rate.

A variety of conductive filler materials may be used to suit particular applications. For instance, in addition or as an alternative to metallic flakes, metallic spheres can be used. The size and composition of the filler materials can be chosen to be small enough to avoid rendering the resulting composite too brittle, while facilitating sufficient thermal conductivity enhancement. In the context of one or more embodiments, it has been recognized/discovered that a composition of about 7-10% of metal flake by volume in a polycarbonate matrix may exhibit thermal conductivity of 0.9 W/m-K and a strain at break over 10% at room temperature, with the potential to achieve 1.8 W/m-K with the use of filler-matrix compatibilizers. Additionally, the conductivity is equal or nearly equal in the flow and crossflow directions with such a composite (e.g., using aluminum). In some geometries, the crossflow conductivity facilitates low thermal conductive resistance in thin walls between fluids for heat exchangers. Filler composition and size can be set to achieve extrusion through nozzles ranging from 0.25 mm to 1 mm. As such, small nozzles can be used to print thin walls, which can lower conduction resistance, while using fillers large enough to facilitate thermal conductivity without clogging nozzles.

Certain embodiments are directed toward a polymer-metallic flake composition having 10% by volume of metal flake, and others having 7.5% by volume of metal flake, respectively dispersed in a polycarbonate matrix. The metal flake may be sized to fit particular applications, and in some implementations, a metal flake (e.g., aluminum) of about 20-50 µm in diameter and less than about 1 µm thick is used. The polycarbonate matrix may be compression molded or made into filament and 3D printed (e.g., by a FFF process). Aluminum and/or copper metal flakes may be used in this regard. Further, filler-matrix compatibilizers can be used to improve bonding between phases. Such materials may also be used for pellet and screw-extruder-based 3D printing, or for injection molding.

As may be implemented in accordance with one or more embodiments, a method of forming a 3D structure includes forming respective stacked layers by depositing a continuous bead of material along an uninterrupted path that defines a first layer and successive stacked layers of a sidewall of the 3D structure. The sidewall is formed having opposing surfaces respectively defined by the stacked layers, depositing the continuous bead of material along the path and with a surface thereof in contact with a surface of the continuous bead of material of an adjacent one of the stacked layers. In various contexts, depositing the continuous bead of material along the uninterrupted path includes extruding or otherwise placing a bead of material that extends uninterrupted from a beginning of the path in the first layer, to an end of the path in one of the successive stacked layers over the first layer. This may involve, for example, the formation of two or more such stacked layers. As such, the continuous bead of material may be implemented without breaks between layers or otherwise, which may facilitate desirable structural characteristics. Each layer can be offset relative to the underlying layer, facilitating the generation of 3D structure. Further, multiple sets of two or more stacked layers may be formed in a larger arrangement and stacked upon one another, a continuous bead being implemented for each set (e.g., where the bead may be broken between the respective sets of stacked layers).

The continuous bead of material may be imparted with a conductivity that is similar along a length of the material being deposited, relative to a width of the same material (e.g., with conductivities within about 20%, or within about 10%). Such aspects may involve using metallic flakes, which may further be sized to facilitate extrusion for 3D printing. In this context, it has been recognized/discovered that, by utilizing metallic flakes with a size and composition selected in this regard to facilitate enhanced conductivity while maintaining the ability to extrude the material including the flakes and further avoid breaking of the resulting extrudate. In some implementations, conductivity is within 20% in two principal directions, and substantially higher than a third direction along the extrudate.

A variety of structures may be formed in this manner, with the formation of 3D sidewall characteristics facilitated via use of the continuous bead of material. In some embodiments, a heat exchanger is formed by stacking the layers with an offset relative to each other to define a recessed portion of the sidewall. The resulting sidewall may thus be configured to exchange heat between fluid materials respectively in contact with opposing interior and exterior surfaces of the recessed portion of the sidewall, and to prevent the fluid materials from contacting each other. When implemented with 3D printing, a design and corresponding tool path can thus be chosen such that the sidewall can be formed with the recess with continuous extrusion from a nozzle.

The continuous bead of material can be implemented to form stacked layers in a variety of manners. In some implementations, the material is a polymer material that is modified to increase thermal conductivity and used to form a heat exchanger with the layers thereof stacked with an offset relative to each other to define a conical portion of the sidewall. The conical portion may be implemented with a base and an apex that are disposed laterally relative to one another in a direction along one of the stacked layers, which can be used to facilitate 3D printing with a continuous bead of material. For these and other applications, the continuous bead of material may be extruded from an extruder nozzle while moving the extruder nozzle along the path.

In various embodiments, a material including metallic material such as flakes or sphere-based material is deposited, with the metallic material enhancing conductivity of the material. Metallic flakes may be planar, and can be sized such that they facilitate extrusion and bending without fracture of the resulting extrudate. In some implementations, metallic flakes are used to form thermal conductivity paths extending between opposing surfaces of a sidewall and through the metallic flakes, with some or all of the metallic flakes having a planar surface area extending along a direction of a thickness of the sidewall. Sphere-based shapes in this context may include spheres and shapes including spheres that are not perfectly spherical (e.g., oblong or having rippled surfaces).

In some embodiments, the continuous bead of material is deposited to form a conductive, watertight heat exchanger having a sidewall with tapered and hollow structures that admit fluid and exchange heat with the fluid. This may be effected by 3D-printing the continuous bead of material with a conductive polymer material along the path. This approach and/or other approaches as noted herein may involve depositing a continuous bead of material from a spool around which the continuous bead of material is wound. Such deposition involving a spool may further utilize a polymer having conductive flakes of a size and making up a percentage of the continuous bead of material set to facilitate extrusion from a nozzle and to mitigate breakage of the continuous bead of material as it is wound around the spool.

The continuous bead of material may be solidified upon cooling, or cured for solidification. Different layers of a resulting 3D structure may thus involve solidifying respective layers at different times as they are formed (e.g., a first layer begins to solidify while further layers are being deposited), or cured at once.

Another embodiment is directed to an apparatus comprising stacked layers of a continuous bead of material extending along a path that defines a sidewall of a 3D structure. A first stacked layer defines a first layer of the 3D structure, with a sidewall of the 3D structure having opposing surfaces being respectively defined by the first stacked layer and successive stacked layers thereof the 3D structure. Each stacked layer includes a portion of the continuous bead of material that extends along the path and with a surface thereof in contact with a surface of the continuous bead of material of an adjacent one of the stacked layers. The continuous bead of material may include metallic flakes that conduct heat through the sidewall. In some implementations, the sidewall forms a heat exchanger and the stacked layers therein are stacked with an offset relative to each other to define a recessed portion of the sidewall (or other 3D features). The heat exchanger flows a first fluid along one side of the sidewall and exchanges heat with a second fluid on the other side of the sidewall while preventing the first and second fluids from intermixing. Such a structure having an entire sidewall formed of an uninterrupted bead of material can be utilized to address challenges such as those characterized hereinabove.

One or more aspects of the disclosure are directed to an article of manufacture and/or its use. The article of manufacture comprises a polymer-based material and a plurality of metal-based flakes dispersed within the polymer-based material. The polymer-based material with the plurality of metal-based flakes therein provide conductivity (upon extrusion) along a length thereof that is about equal to conductivity along its width. For instance, conductivity along the length may be within about 10%, or within about 20%, of conductivity along the width/thickness.

When the article of manufacture is extruded from a nozzle for 3D printing, the resulting structure exhibits conductivity that is therefore generally similar in respective directions of length and thickness, which facilitates heat transfer. Such heat transfer aspects can be particularly beneficial in heat exchanger applications. For instance, a sidewall of a 3D structure can be formed via extrusion from the nozzle for 3D-printing the sidewall, in which the width of the sidewall corresponds to the width of the extrudate. Successive layers of a continuous bead of such material can be stacked with an offset to create 3D structures along the sidewall, such as structures to facilitate the exchange of heat between respective fluids on opposing sides of the sidewall. Further, the continuous bead helps ensure that the fluids are maintained separate from one another.

In some implementations, the article of manufacture includes metal-based flakes dispersed therein, at a composition of about 5-15% or 7.5-10% metal flakes by volume of a polycarbonate matrix. Such a matrix may further exhibit thermal conductivity in the range of 0.5-3.0 W/m-K or 0.9-2.0 W/m-K, and a strain at break over 10% at room temperature, the latter of which may facilitate spooling. For instance, in some embodiments the extrudate is configured to be wound around a spool and subsequently deposited by unwinding from the spool to form a 3D structure. In connection with these and other aspects involving a composition of matter, it has been recognized/discovered that such ranges of metal flake composition can be used to achieve sufficient flowability for extrusion while ensuring that the resulting product is not too brittle, with conductivity sufficient for heat exchanger applications.

Turning now to the figures, FIG. 1 shows a data flow diagram, as may be implemented in accordance with various embodiments. At block 100, deposition of a continuous bead of material is initiated, such as by positioning a nozzle or spool of material relative to a surface or other component at which a 3D structure is to be formed. Such a material may, for example, include a polymer material with a conductive filler such as metal flakes and/or spheres therein.

At block 110, a first layer of a 3D structure is formed by continuing deposition of the continuous bead of material along an uninterrupted path. This may involve, for example, forming a first layer of a heat exchanger as characterized herein, with a continuous (unbroken) material having enhanced thermal conductivity. Successive layers of the 3D structure are formed at block 120, by continuing the deposition of the continuous bead of material along the uninterrupted path until the 3D structure is completed at block 130, where the deposition is terminated. As such, the material in each layer is formed of a single, continuous (unbroken) material extending from an initially-deposited portion of the first layer through a finally-deposited portion of material in a top layer.

Figure 2:
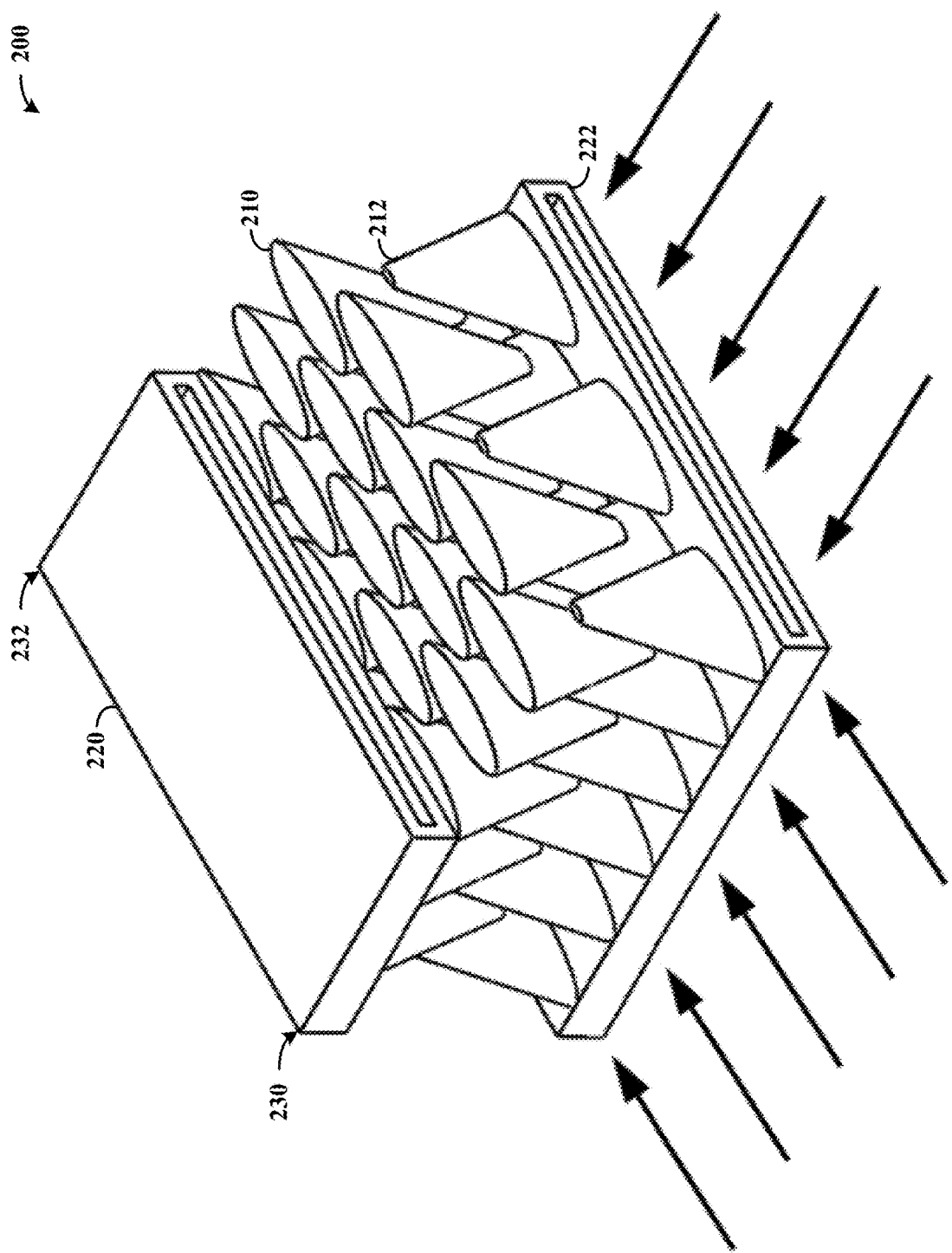
FIG. 2 shows a cut-away view of a heat exchanger apparatus, as may be formed and/or implemented in accordance with various embodiments.

FIG. 2 shows a cut-away view of a heat exchanger apparatus 200, as may be formed and/or implemented in accordance with various embodiments. The apparatus 200 includes a plurality of conical structures, with conical structures 210 and 212 labeled by way of example, respectively extending from opposing sidewall portions 220 and 222. The apparatus 200 may be formed, for example, with a continuous bead of material initially deposited at a first layer end 230 and continuously deposited along an uninterrupted path through a last layer 232. Arrows show possible fluid flow directions, with a first fluid flowing through an opening within the sidewall portions and extending into an interior of the conical structures, and a second fluid flowing in a perpendicular direction past an exterior of the conical structures.

Figure 3A:
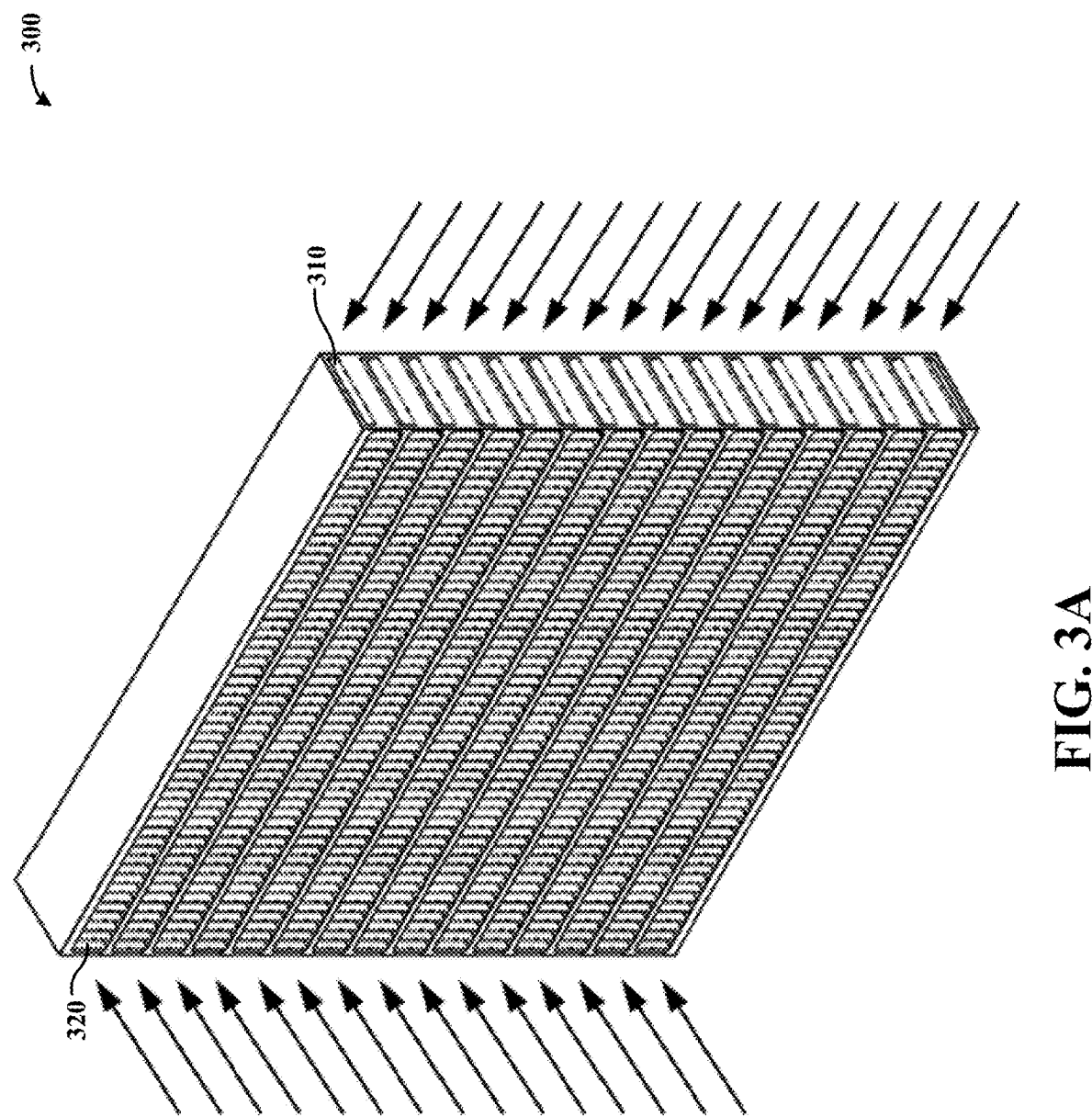
Figure 3B:
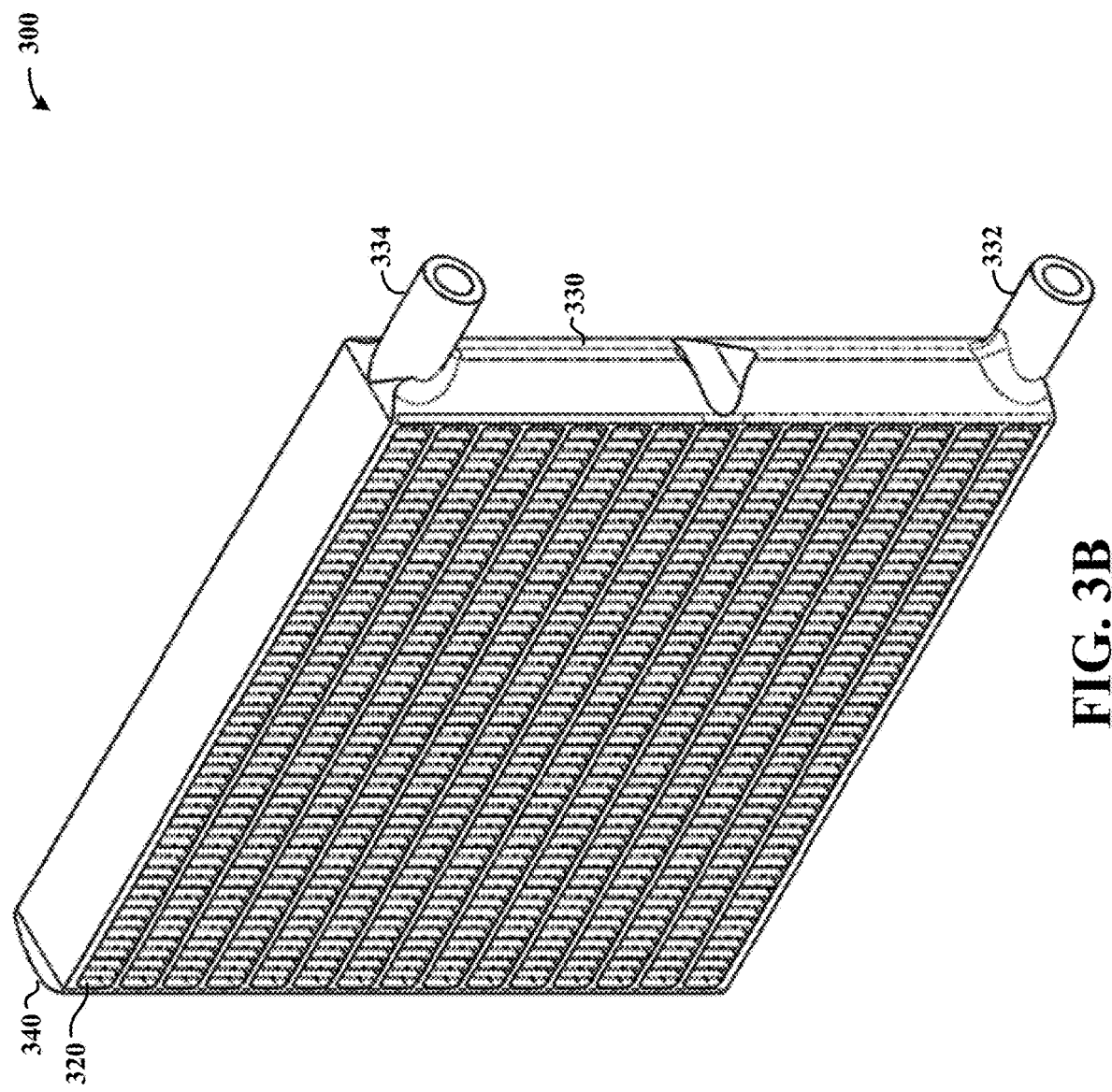

FIGS. 3A and 3B show a heat exchanger apparatus 300 as may be formed and/or implemented in accordance with various embodiments. Beginning with FIG. 3A, a perspective view of the apparatus 300 is shown with cross-flow characteristics. Arrows on the right side show fluid flow into openings within sidewalls extending along a length of the apparatus 300, with opening 310 labeled by way of example. Arrows to the left show fluid flow into openings through fins extending across a width of the apparatus, with opening 320 labeled by way of example.

FIG. 3B shows a perspective view of the apparatus 300 with a header 330 and cap portion 340 attached thereto. Inlet/outlets 332 and 334 are provided to flow fluid through the sidewalls and fins. The header 330 and cap 340 may include structure to effect serial fluid flow through the sidewalls and fins. Fifteen stacked layers of fins are shown, with sidewalls bounding each layer, by way of example. Fewer (or even on) such layer may be used, as may more layers.

Figure 4:
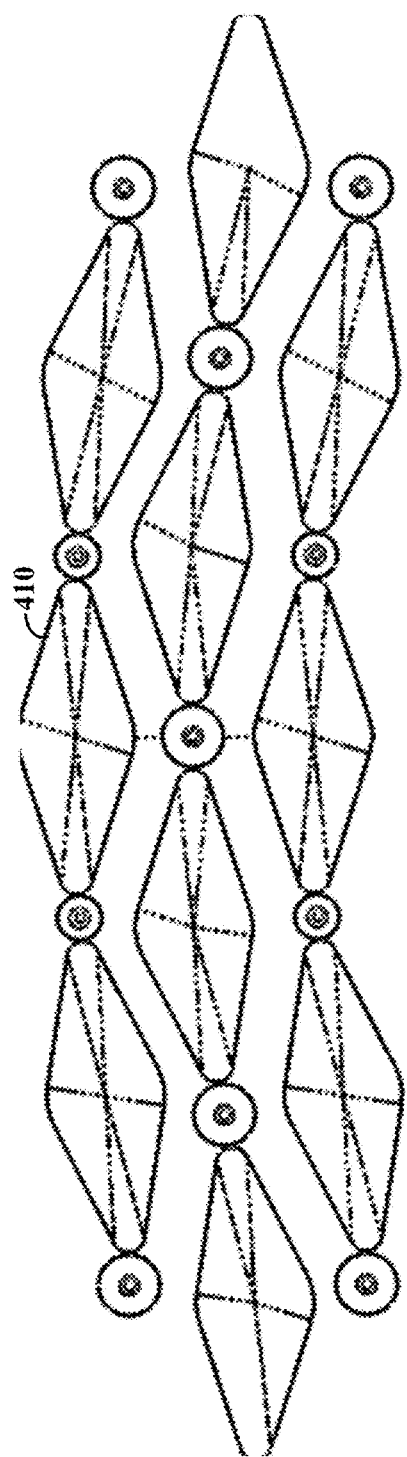
FIG. 4 shows a top view of an arrangement of conical structures for a heat exchanger apparatus, as may be formed and/or implemented in accordance with various embodiments.

FIG. 4 shows a top view of an arrangement 400 of conical structures for a heat exchanger apparatus, as may be formed and/or implemented in accordance with various embodiments. Conical structure 410 is labeled by way of example, with each conical structure shaped and arranged relative to the others in a varied form. Such an approach may, for example, be used with a structure such as shown in FIG. 2 or in other figures.

Figure 5:
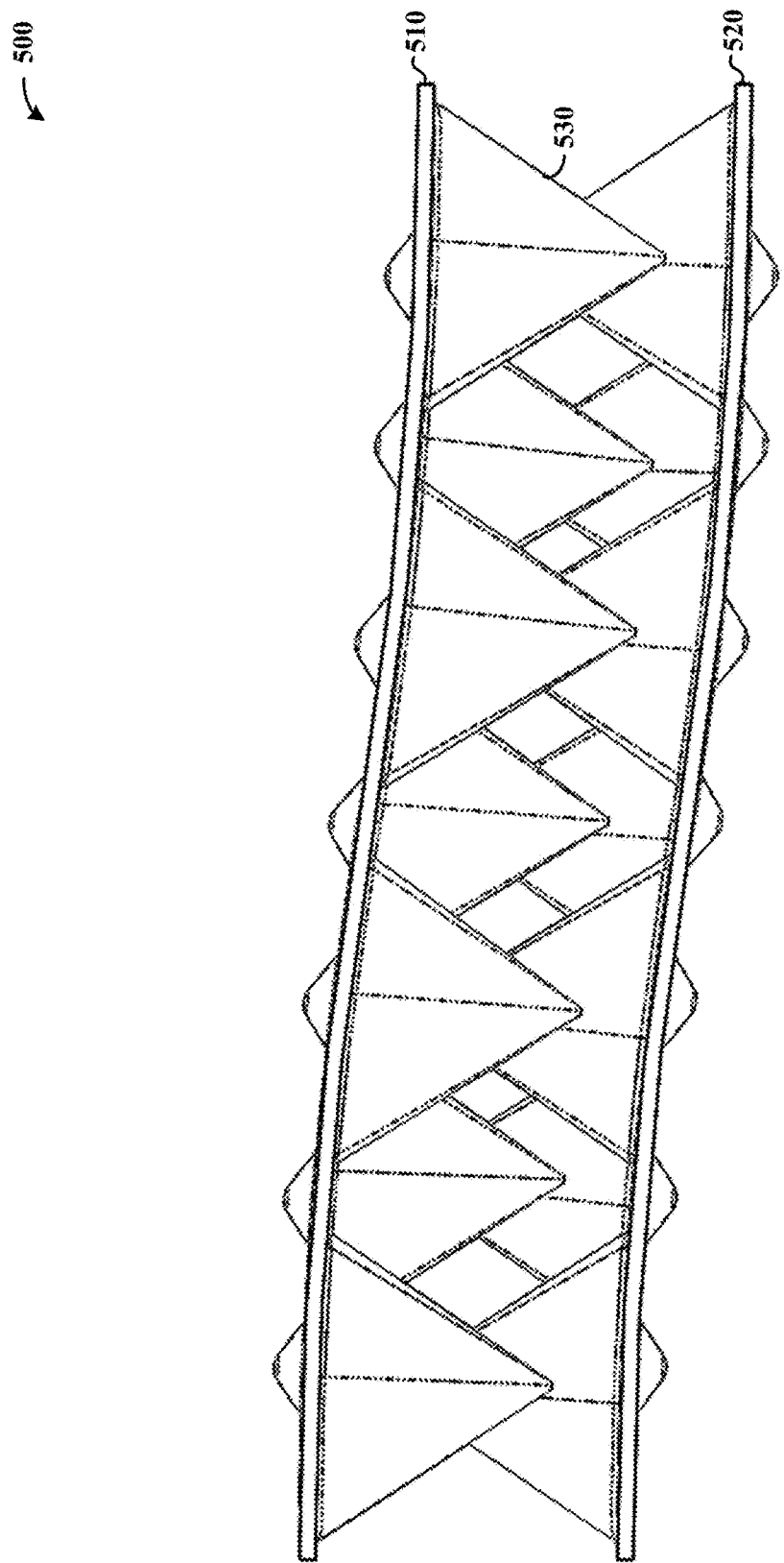
FIG. 5 shows a side view of conical structures in a heat exchanger apparatus, as may be formed and/or implemented in accordance with various embodiments.

FIG. 5 shows a side view of conical structures in a heat exchanger apparatus 500, as may be formed and/or implemented in accordance with various embodiments. The apparatus 500 may be formed using a continuous deposition approach, such as may be consistent with that characterized herein. Fluid may flow through sidewalls 510 and 520, and into the interiors of the cones protruding therefrom, including cone 530 labeled for reference. Other fluid may flow around the exterior of the cones. Heat can thus be exchanged between the respective fluids.

Figure 6A:
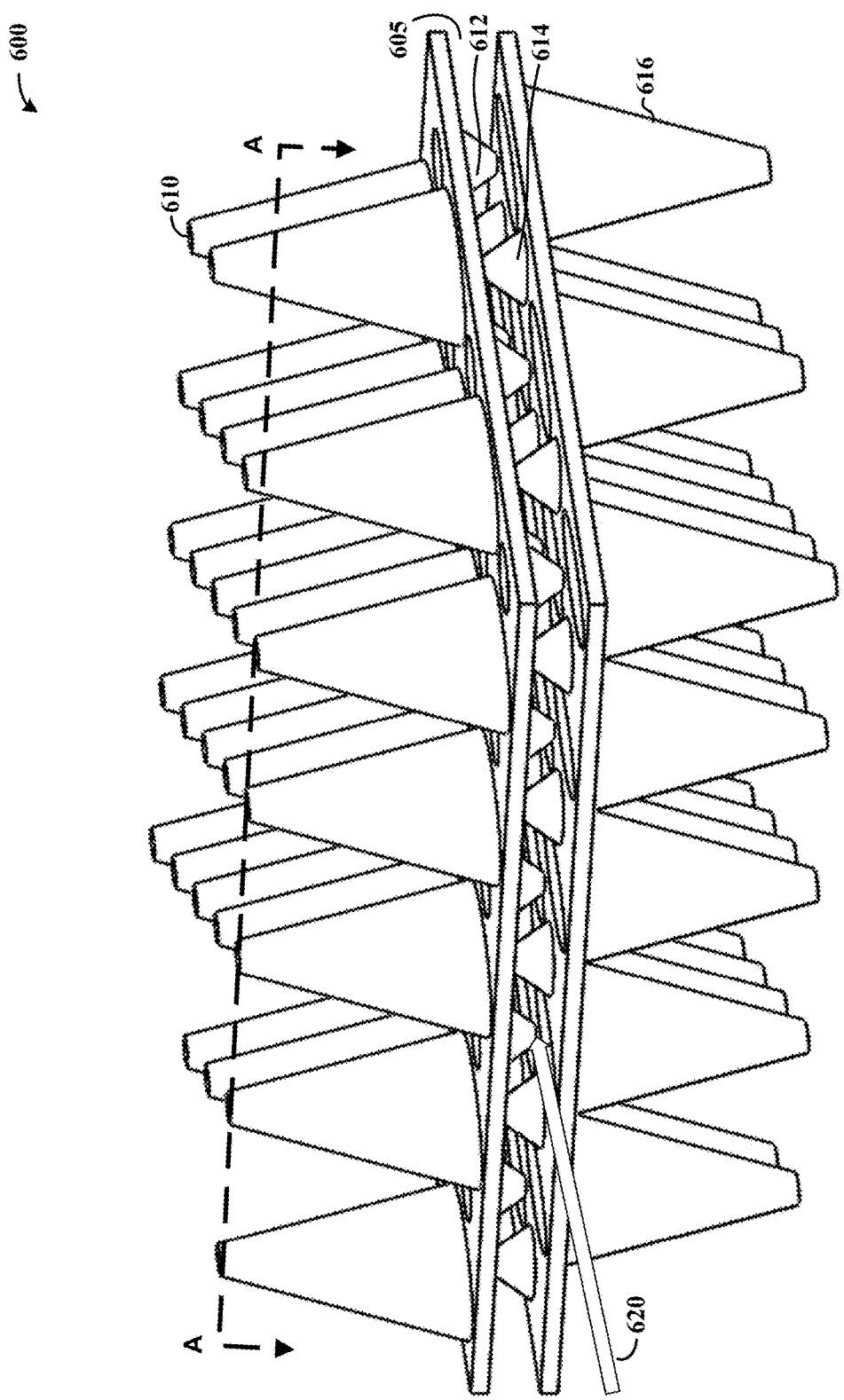
FIGS. 6A and 6B respectively show perspective and cross-sectional views of a heat exchanger, as may be formed and/or implemented in accordance with various embodiments.
Figure 6B:
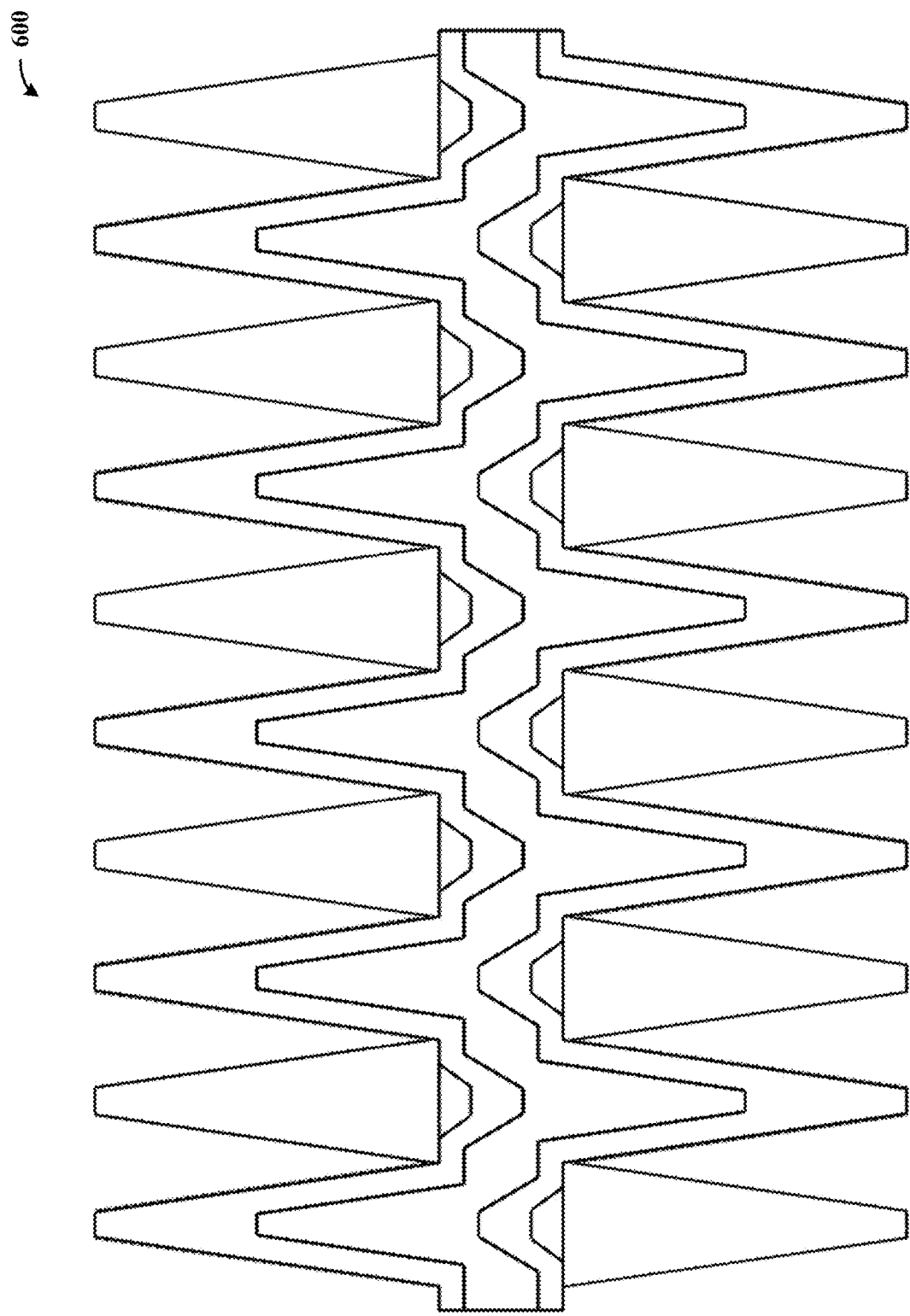

FIGS. 6A and 6B respectively show perspective and cross-sectional views (along section A-A) of a heat exchanger 600, as may be formed and/or implemented in accordance with various embodiments. The heat exchanger 600 may, for example, be formed using a continuous material, beginning a back side 605, and forming conical structures including 610, 612, 614 and 616 that are labeled for reference. A first fluid may flow, for example, through a sidewall area as shown by arrow 620, around smaller cones (including 612 and 614) and within the interior of the larger cones (including 610 and 616).

Figure 7A:
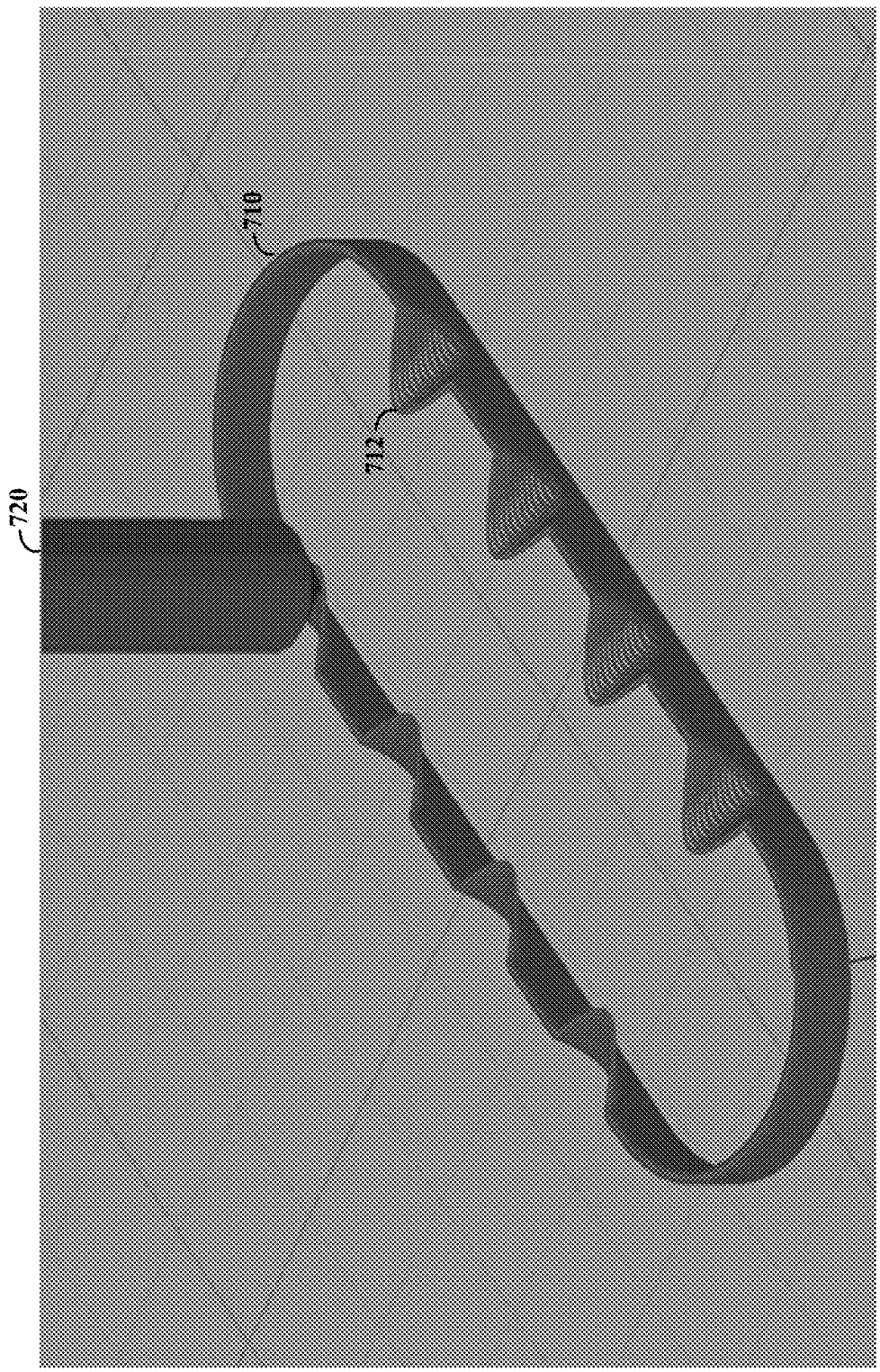
FIGS. 7A and 7B show a perspective view of an apparatus at respective stages of manufacture, as may be formed and/or implemented in accordance with various embodiments.
Figure 7B:
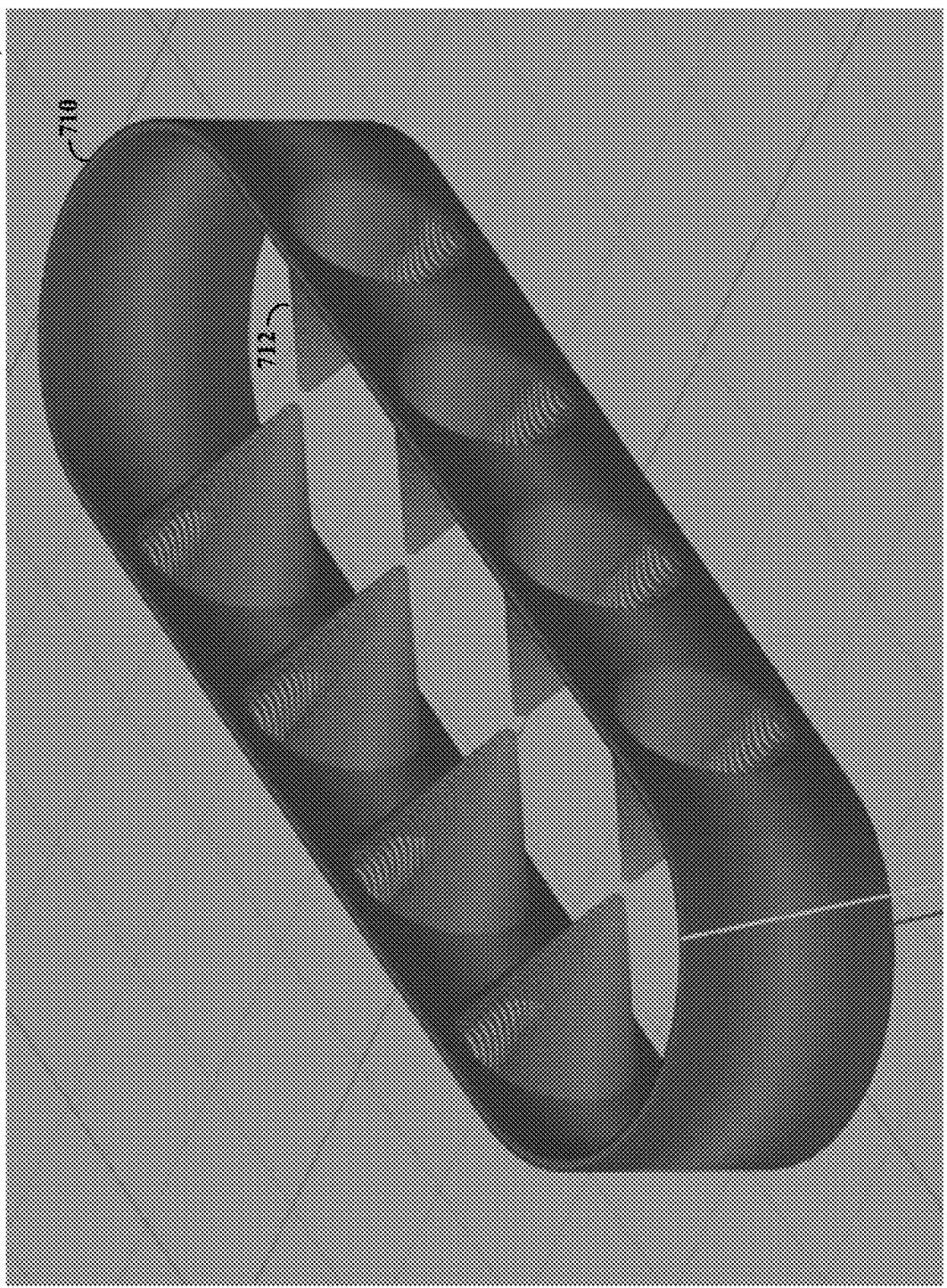

FIGS. 7A and 7B show a perspective view of an apparatus 700 at respective stages of manufacture, as may be formed and/or implemented in accordance with various embodiments. Referring to FIG. 7A, several layers of a sidewall 710 of the apparatus 700 are shown having been formed using a deposition tool 720. For illustration, four cones are shown as being formed respectively protruding from opposing sides of the sidewall 710. For illustration, individual layers are shown with a slight gap within the cones; however, such layers may be formed (or solidify) with surfaces thereof in contact with one another. Turning to FIG. 7B, the apparatus 700 has been formed further, with cone 712 being complete. As can be seen, fluid may flow around an outer portion of the sidewall 710 and within an interior of the cones, and another fluid may flow within an interior of the sidewall 710 and around an exterior of the cones. As such, heat exchange is facilitated between the respective fluids.

Figure 8:
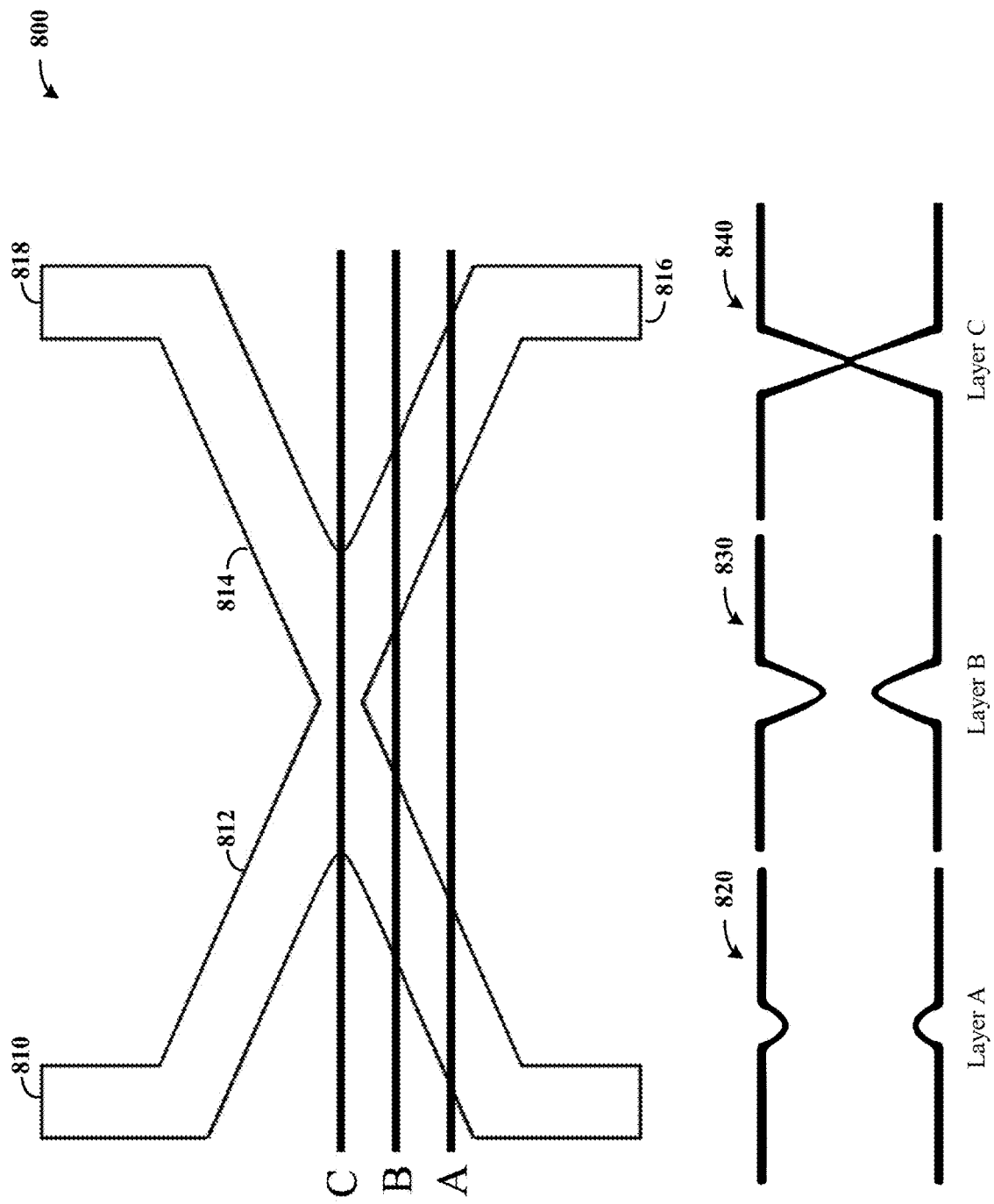
FIG. 8 shows a side view and three respective cross-sectional views of a 3D apparatus, as may be implemented in accordance with one or more embodiments.

FIG. 8 shows a side view and three respective cross-sectional layer views of a 3D apparatus 800, as may be implemented in accordance with one or more embodiments. The apparatus 800 includes a sidewall 810 with cones 812 and 814 protruding therefrom. The apparatus 800 may, for example, be implemented in accordance with the apparatus shown in FIG. 7, with sidewall 810 extending around in a shape similar to that shown therein. The apparatus 800 may be formed from the bottom-up, beginning at 816 and ending at 818. Cross-sectional layer views are shown for Layer A (820), Layer B (830) and Layer C (840).

Based upon the above discussion and illustrations, those skilled in the art will readily recognize that various modifications and changes may be made to the various embodiments without strictly following the exemplary embodiments and applications illustrated and described herein. For example, a variety of different shapes and patterns may be formed, with designs facilitating movement of a tool along a continuous tool path to create a 3D structure. As such, a multitude of disparate designs can be formed in this manner. Further, the composition of respective structures can be altered to include one or more of a variety of materials, which may further include one or more of a variety of conductive additives. Such modifications do not depart from the true spirit and scope of various aspects of the invention, including aspects set forth in the claims.

What is claimed is:

1. A method of forming a heat exchanger, the method comprising:
    forming a first stacked layer by depositing a continuous bead of material along an uninterrupted path that defines a first layer of a three-dimensional (3D) structure of the heat exchanger; and
    forming a sidewall of the 3D structure having opposing surfaces respectively defined by the first stacked layer and one or more successive stacked layers of the 3D structure by, for each successive stacked layer, continuing depositing the continuous bead of material uninterruptedly from the first stacked layer along the path and with a surface thereof in contact with a surface of the continuous bead of material of an adjacent one of the stacked layers, including forming the heat exchanger by stacking the layers with an offset relative to each other to define a conical recessed portion of the sidewall.

2. The method of claim 1, wherein forming the heat exchanger includes configuring the sidewall to exchange heat between fluid materials respectively in contact with opposing interior and exterior surfaces of the recessed portion of the sidewall, and to prevent the fluid materials from contacting each other.

3. A The method of forming a heat exchanger, the method comprising:
    forming a first stacked layer by depositing a thermally conductive continuous bead of material along an uninterrupted path that defines a first layer of a three-dimensional (3D) structure; and
    forming a sidewall of the 3D structure having opposing surfaces respectively defined by the first stacked layer and one or more successive stacked layers of the 3D structure by, for each successive stacked layer, continuing depositing the continuous bead of material uninterruptedly from the first stacked layer along the path and with a surface thereof in contact with a surface of the continuous bead of material of an adjacent one of the stacked layers, including stacking the layers with an offset relative to each other to define a conical portion of the sidewall, the conical portion having a base and an apex that are disposed laterally relative to one another in a direction along one of the stacked layers.

4. The method of claim 1, wherein depositing the continuous bead of material includes extruding the continuous bead of material from an extruder nozzle while moving the extruder nozzle along the path, and therein forming a deposited bead that continuously extends uninterrupted throughout the stacked layers.

5. The method of claim 1, wherein forming the successive stacked layers includes forming at least one of the stacked layers offset relative to one of the stacked layers upon which it is formed.

6. The method of claim 1, wherein depositing the continuous bead of material includes depositing material including metallic flakes.

7. The method of claim 6, wherein depositing the material including the metallic flakes includes forming thermal conductivity paths extending between the opposing surfaces of the sidewall and through the metallic flakes, with the metallic flakes having a planar surface area extending along a direction of a thickness of the sidewall.

8. The method of claim 1, wherein depositing the continuous bead of material includes forming the heat exchanger as a conductive, watertight heat exchanger having a sidewall with tapered fins configured to flow fluid and exchange heat with the fluid, by 3D-printing the continuous bead of material with a conductive polymer material along the path.

9. The method of claim 1, wherein depositing the continuous bead of material includes depositing the bead from a spool around which the continuous bead of material is wound.

10. The method of claim 9, wherein depositing the continuous bead of material includes depositing a polymer having conductive flakes, the conductive flakes being of a size and making up a percentage of the continuous bead of material set to facilitate extrusion from a nozzle and to mitigate breakage of the continuous bead of material as it is wound around the spool.

11. The method of claim 1, wherein the continuous bead of material is a polymer material having conductive flakes therein and exhibits conductivity across a thickness of the sidewall that is equal to conductivity along a length of the sidewall.

12. The method of claim 1, wherein the continuous bead of material includes conductive fillers having a sphere-based shape.

13. A method comprising:
forming a first stacked layer by depositing a continuous bead of material along an uninterrupted path that defines a first layer of a three-dimensional (3D) structure; and
forming a sidewall of the 3D structure having opposing surfaces respectively defined by the first stacked layer and one or more successive stacked layers of the 3D structure by, for each successive stacked layer, depositing the continuous bead of material along the path and with a surface thereof in contact with a surface of the continuous bead of material of an adjacent one of the stacked layers, including:
forming thin portions of the sidewall having a thickness of a width of the continuous bead of material and in which the continuous bead of material is unbroken,
forming thick portions of the sidewall having a thickness greater than the width of the continuous bead of material, and
forming respective sets of successively stacked layers of the sidewall, each set being formed with a continuous bead of material and with a break between the continuous bead of material in respective ones of the sets in a thick portion of the sidewall.

14. A heat exchanger apparatus comprising:
a first stacked layer of a continuous bead of material extending along a path that defines a first layer of a three-dimensional (3D) structure; and
a sidewall of the 3D structure having opposing surfaces respectively defined by the first stacked layer and successive stacked layers of the 3D structure, each stacked layer including a portion of the continuous bead of material that extends uninterruptedly from the first stacked layer and through the successive stacked layers, along the path and with a surface thereof in contact with a surface of the continuous bead of material of an adjacent one of the stacked layers, the continuous bead of material that extends uninterruptedly forming the heat exchanger with the stacked layers being offset relative to one another to define a conical recessed portion of the sidewall, the sidewall being configured for exchanging heat between respective fluids passing on opposing surfaces of the sidewall while maintaining the fluids separate from one another.

15. The apparatus of claim 14, wherein
the heat exchanger is configured and arranged to flow a first fluid along one side of the sidewall and exchange heat with a second fluid on the other side of the sidewall while preventing the first and second fluids from intermixing.

16. The apparatus of claim 14, wherein the continuous bead of material includes metallic flakes configured and arranged to conduct heat through the sidewall.

17. A method of 3D-printing, the method comprising:
forming a conductive polymer-based material by dispersing a plurality of metal-based flakes in a polymer,
forming a 3D structure by extruding the conductive polymer-based material from a nozzle along a continuous path and uninterruptedly depositing the extruded material as an uninterrupted continuous bead that extends uninterruptedly through respective layers of the 3D structure and forms a heat exchanger including stacked layers offset relative to one another that define a conical recessed portion of a sidewall.

18. The method of claim 17, wherein extruding the conductive polymer-based material from a nozzle along a continuous path includes stacking layers of a continuous bead of the extruded polymer-based material to form sidewalls of the 3D structure, including said recessed portion of the sidewall, and including a deposited bead that continuously extends uninterrupted throughout the stacked layers.

19. The method of claim 17, wherein extruding the conductive polymer-based material from a nozzle along a continuous path includes forming a sidewall of the 3D structure having conductivity along a length thereof that is within 20% of conductivity in a direction across a thickness of the sidewall.

* * * * *